Jan. 3, 1933. F. E. BLANC 1,892,863
CUTTING TOOL
Filed Nov. 18, 1930
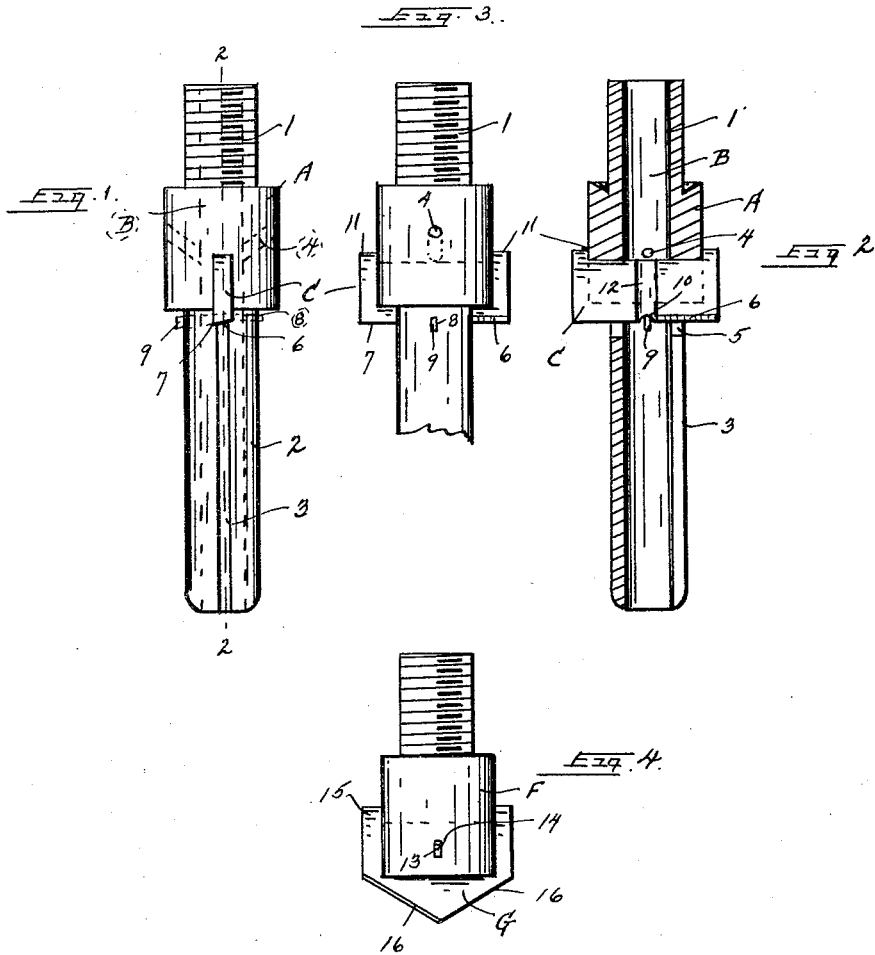
Inventor
Francis E. Blanc
By R. M. Thomas
Attorney Patented Jan. 3, 1933

1,892,863

UNITED STATES PATENT OFFICE

FRANCIS E. BLANC, OF PARK CITY, UTAH

CUTTING TOOL

REISSUED

Application filed November 18, 1930. Serial No. 496,462.

My invention relates to diamond drilling and has for its object to provide a new and efficient cutting tool for cutting out core barrels and rods which have been broken off and lodged in the hole being drilled.

A further object is to provide a cutting tool for use in diamond drilling which tool is used to cut out steel lost in the hole, said tool being provided with water conduits and ducts adapted to carry off the cuttings in the most satisfactory manner.

A still further object is to provide a cutting tool which will be quick acting, efficient and economical to manufacture and use.

These objects I accomplish with the device illustrated in the accompanying drawing in which similar numerals and letters of reference indicate like parts throughout the several views and as described in the specification forming a part of this application and pointed out in the appended claim.

In the drawing in which I have shown the best and most preferred manner of building my invention Figure 1 is a side elevation of the device. Figure 2 is a section on line 2—2 of Figure 1. Figure 3 is a side elevation of Figure 2. Figure 4 is a modified form of constructing the cutting tool when the core is not used but a cutting blade is mounted on the end of the tool.

In the drawing I have shown the cutting tool as made of a cylindrical body A, having a bore B centrally therethrough and having the top end 1 externally threaded and of smaller diameter than the rest of the tool. This threaded portion is to be screwed into the threaded end of the drilling rod. The central bore is to allow for flow of flushing and cleaning water therethrough. The lower end or core 2 of the body A is made of smaller diameter to fit into the bore of the broken off rod or barrel and has slots 3 formed longitudinally therein to aid in cleaning the hole of cuttings. Diagonal ports or water flow holes 4 are bored through the body at an angle to the central bore to aid in cleaning the hole, but such holes may be plugged when desired and other holes bored to take their place, depending on the circumstances under which the tool is being used.

Diametrically across the lower end of the body A, I provide a slot 5 the body of which slot is longitudinal with the body A of the tool and a cutting blade C is placed in said slot with the ends 6 extending beyond the edges of the body the same diameter of the hole in which the tool is being used. The lower edge 6 of the blade C is cut at an angle to provide a cutting face 7 which face is adapted to cut away the rod or barrel with which it comes in contact. The slot 5 is formed across the body A and the upper end of the core 2, so that the cutting edge of the tool is below the level of the body A. Across the core 2 at right angles to the slot 5, I provide a tapered hole 8 in which a tapered pin 9 is driven to engage a notch 10 in the lower edge of the blade C, raising the blade C to the top of the slot 5 and securely holding the blade in place in the tool. The top side of the blade is formed with shoulders 11 one on each side thereof, said shoulders to fit against the outer edge of the body A when the pin 9 has been driven into the hole 8, raising the blade to its proper cutting position, said shoulders to aid in holding the blade secured in the tool body A. Each side face of the blade C is cut away in a curved groove 12, to provide space around the tool for flow of water through the bore B around the blade.

The type of tool shown in Figure 4 is formed of a body F, having a slot formed across the bottom end thereof in which a cutting blade G is carried. The blade is secured in the body by a tapered pin 13 being driven into a tapered hole 14 raising the blade until the shoulders 15 are along the side of the body F and the hole 14 is through the body F. In this type of tool, there being no core formed thereon, as this type is for cutting out obstacles which have had their bores closed either by cuttings or other obstacles such as cement etc.

It will be obvious that slight modifications may be made in the device to meet varying conditions of cutting without departing from the spirit of the invention or the scope of the claim.

The operation of the tool is as follows:—

The body A is screwed into the drilling rod and the tool or blade C is secured in the body. The rod is then let down the hole until the blade engages the rod or barrel to be cut. The core is placed in the bore of the rod or barrel and the rod is then rotated, rotating the tool and cutting off the rod or barrel, and water is pumped through the bore of the rod and tool to carry out the cuttings.

Having thus described my invention I desire to secure by Letters Patent and claim:—

In a cutting tool of the class described the combination of a cylindrical body having the top end of smaller diameter and externally threaded and with a transverse slot across said body at the lower end thereof with the lower end extended into a guide core; longitudinal slots in the core of said body; a cutting blade carried in diametrically opposed slots through said body said blade having the opposed lower edges sharpened; a tapered pin driven through a hole in said body under said blade and at right angles thereto to hold the blade fixed in relation to said body; ports through said body above said blade to direct water currents therethrough; and means to allow water to be pumped through the ports and the longitudinal slots to carry off the cuttings of the blade.

In testimony whereof I have affixed my signature.

FRANCIS E. BLANC.